United States Patent [19]
Adams, Louis R.

[11] Patent Number: 4,958,474
[45] Date of Patent: Sep. 25, 1990

[54] TRUSS STRUCTURE

[75] Inventor: Adams, Louis R., Ojai, Calif.

[73] Assignee: Astro Aerospace Corporation, Carpinteria, Calif.

[21] Appl. No.: 317,074

[22] Filed: Feb. 28, 1989

Related U.S. Application Data

[63] Continuation of Ser. No. 51,743, May 18, 1987, abandoned.

[51] Int. Cl.$^5$ ............................................. E04H 12/18
[52] U.S. Cl. ......................................... 52/646; 52/108; 52/118
[58] Field of Search ................. 52/111, 645, 646, 109, 52/632, 118, 108; 182/152

[56]  References Cited

U.S. PATENT DOCUMENTS

| | | | |
|---|---|---|---|
| 3,486,279 | 12/1969 | Webb | 52/108 |
| 3,783,573 | 1/1974 | Vaughan | 52/646 |
| 4,276,726 | 7/1981 | Derus | 52/109 |
| 4,337,560 | 7/1982 | Slysh | 29/155 R |
| 4,480,415 | 11/1984 | Truss | 52/108 |
| 4,557,097 | 12/1985 | Mikulas, Jr. et al. | 52/646 |
| 4,569,176 | 2/1986 | Hedgepeth et al. | 52/645 |
| 4,599,832 | 7/1986 | Benton et al. | 52/118 |
| 4,655,022 | 4/1987 | Natori | 52/646 |
| 4,667,451 | 5/1987 | Onoda | 52/646 |
| 4,677,803 | 7/1987 | Mikulas, Jr. et al. | 52/646 |

Primary Examiner—Richard E. Chilcot, Jr.
Attorney, Agent, or Firm—Spensley Horn Jubas & Lubitz

[57] ABSTRACT

A deployable truss structure desirable for space applications is disclosed. The structure is triangular in cross section, with each longitudinal face of the structure being comprised of parallel longeron members interconnected by parallel batten members, the battens located at the mid-section of each face being non-rigid members, the structure including hinged diagonal members.

16 Claims, 4 Drawing Sheets

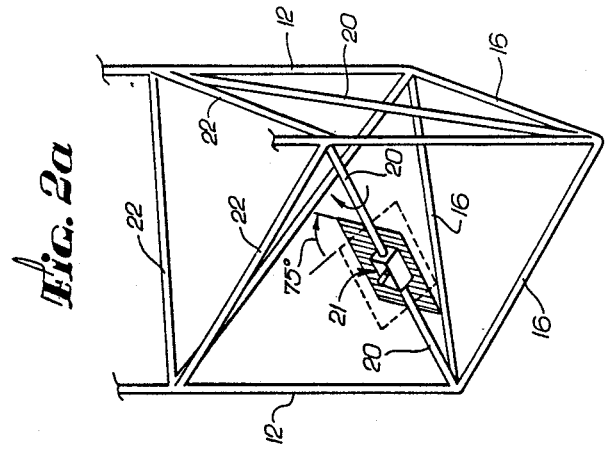
Fig. 2a
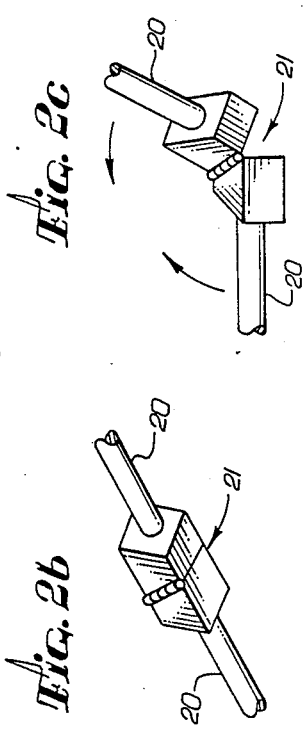
Fig. 2c
Fig. 2b
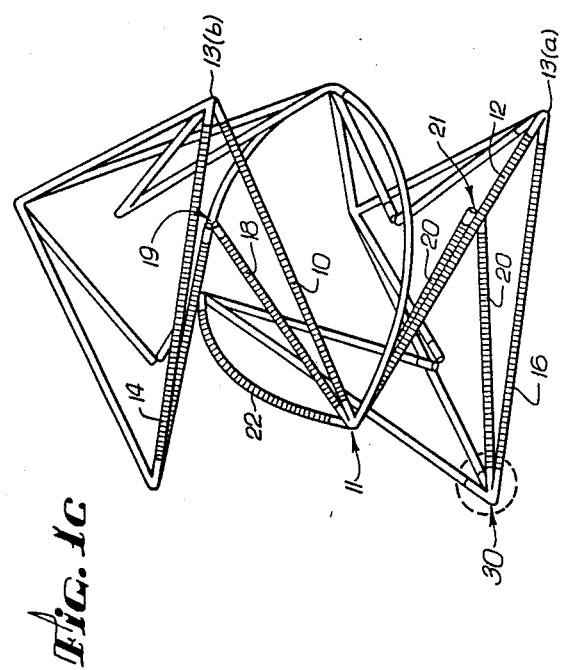
Fig. 1c
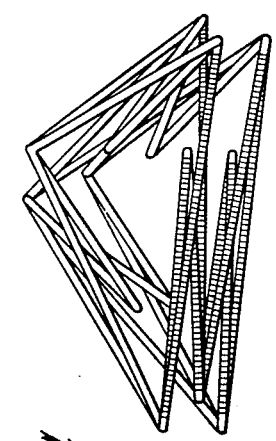
Fig. 1d

TRUSS STRUCTURE

This is a continuation of application Ser. No. 07/051,743 filed on May 18, 1987, now abandoned.

BACKGROUND OF THE INVENTION

1. Field of the Invention

This invention relates to truss structures and, more particularly, to deployable truss structures desirable for space applications.

2. Description of the Related Art

A truss structure is generally composed of straight members subject only to longitudinal compression, tension or both; the members are disposed so as to make the structure rigid under anticipated loads. Truss members include longerons (longitudinal members); battens (typically short members perpendicular to at least one longeron); and diagonals (bracing members). Typically, the batten members are connected end-to-end to form a batten frame; the batten frames are then joined to each other by the longitudinal members, which are usually attached to the batten frames at the end of the batten members. The diagonals typically are joined between batten frames to opposite longerons.

Truss structures are particularly desirable in space applications because of their high strength and/or stiffness and low mass. The stiffness-to-mass ratio of truss structures may be further increased by the use of composite materials as truss members. The inherently repetitive configuration of truss structures makes efficient packaging possible, allowing the members to be joined by hinges that allow the structure to fold or collapse for compact and efficient storage.

Packaging a truss structure by the use of hinges introduces joint compliance, thereby decreasing the stiffness of the truss. In order to optimize stiffness and strength, the number of hinges should be minimized. Some minimization is achieved by the use of single-degree-of-freedom hinges for complex rotations rather than using ball and socket joints or hinged pairs. Further minimization of hinges may be obtained from designing the truss so that structurally significant truss members (those that affect the bending stiffness) do not hinge except at member junctions (which are referred to as truss nodal positions); these significant truss members are also made relatively long.

Single-degree of-freedom hinges are generally utilized either by having two truss members hinged directly to each other at their ends, or by having two truss members each hinged at their ends to a single common joint structure. The use of single-degree-of-freedom hinges often introduces strain in the truss members during the transition between the collapsed and deployed configurations (which themselves are not strained). The strain during transition arises because a pair of hinges which are at opposite ends of a truss member change in angular orientation with respect to each other. This change in angular orientation is a natural consequence of the design evolution whereby non-folding longerons require batten frame rotation for packaging. It is therefore desirable to reduce or eliminate such strain and joint compliance, while optimizing stiffness in a folding truss structure.

SUMMARY OF THE INVENTION

The present invention overcomes the problems described above by providing a truss structure having two batten frames constructed of rigid batten members spaced apart longitudinally on opposite sides of a mid-structure batten frame. This batten frame rotates for collapsing the truss structure, but the common joints at which the batten frame members are connected to the longerons do not pivot or rotate for packaging. The mid-structure batten members are non-rigid, having end hinges which are parallel to the beam axis, and having either a parallel hinge near its center or having sufficiently flexible composition to allow for packaging without folding.

A basic sub-structure of the present invention is formed by a pair of longerons, upper and lower rigid battens, and two folding diagonals. The longerons are joined at their ends to a common joint structure by hinges that are oriented perpendicular to the plane defined by the packaged and deployed longeron directions. Each diagonal is joined by a hinge at one end to the junction of the longerons, and at its other end is joined by a hinge to the free end of a rigid batten. Three such sub-structures are joined at their batten member ends to form the basic truss structure, which thus has a triangular cross-section. The sub-structures are further interconnected at their longitudinal mid-points (the junction of the longerons) by non-rigid batten members, one such batten for each face of the structure. The basic sub-structures each define a plane when deployed and, during the transition between collapsed and deployed positions, the forming members remain approximately parallel to this plane. All hinges of the sub-structure, except for those of the non-rigid batten, remain approximately perpendicular to this plane.

Many of these sub-structures can be placed in a line to form a truss structure. All of the longerons located along a corner of such a truss structure are hinged identically. The longerons are not subject to strain as they move from the collapsed to the deployed configuration.

Each diagonal member is hinged at three places: at each end and near its midpoint. Diagonal hinge orientations are given on either end by the cross product of two vectors, as follows. One of these vectors is the difference between the two unit vectors which define the packaged and deployed centerline directions. The other vector is the difference between the two unit vectors that define the orientations of some other feature of the strut, such as the mid hinge. The collapsed orientation of the diagonal mid hinge is preferrably in the plane of the batten, but also may have a different orientation. The deployed orientation of the diagonal mid hinge is preferrably rotated 75 degrees about the diagonal center line, away from the batten-diagonal plane, but may be oriented in other configurations. The preferred orientations described are consistent with a minimum strain design.

The diagonals are hinged to non-rotating joints, as are the longerons. The flexible batten members themselves may be constructed of tubular aluminum, or may be of a coiled construction, or any other composition that may be flexed and still maintain rigidity when unstrained.

BRIEF DESCRIPTION OF THE DRAWINGS

FIGS. 1(a)–1(d) show a perspective view of a beam structure in accordance with the preferred embodiment of the present invention from fully deployed to fully collapsed. Like reference numerals in the drawings represent like elements.

FIGS. 2(a), 2(b), and 2(c) show a perspective view of a detail of a diagonal hinge.

DETAILED DESCRIPTION OF THE PREFERRED EMBODIMENT

Figure 1B:
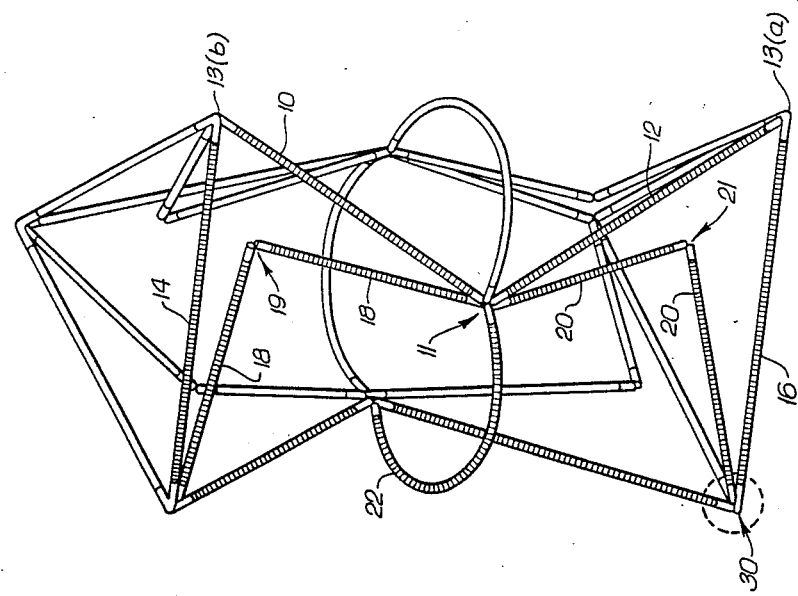
Figure 1A:
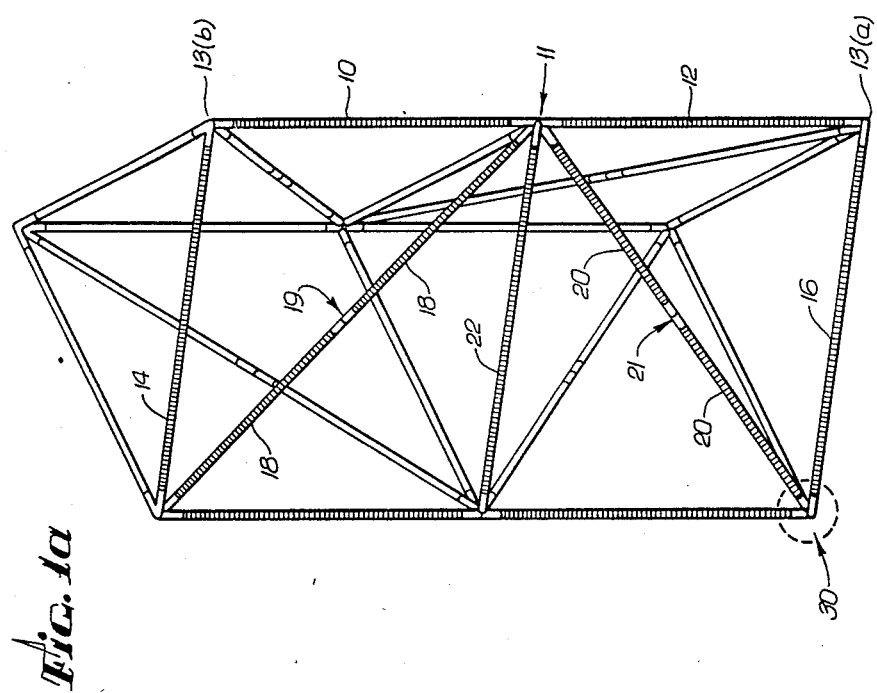

FIG. 1 shows a truss structure constructed in accordance with the present invention. FIG. 1(a) shows the structure in an initial deployed configuration, while FIGS. 1(b), 1(c), and 1(d) show the structure as it is changed to its collapsed configuration. The structure has a triangular cross section. The longitudinal faces of the truss structure are defined by a basic sub-structure. The sub-structure is comprised of two longerons 10, 12 joined together end-to-end by a common hinge joint 11, and each longeron 10, 12 is coupled to a respective rigid batten 14, 16 oriented perpendicularly to the longerons. Each longeron 12, 10 is joined to a rigid batten by a batten-longeron hinge 13(a), 13(b), respectively. All of the hinges used in the preferred embodiment are single-degree-of-freedom hinges. The single-degree-of-freedom hinges are preferably of the type disclosed in a co-pending application by the present inventor for a Collapsible Truss Structure, Ser. No. 42162 filed Apr. 23, 1987. Two folding diagonal members 18, 20 are joined to the other ends of the batten members and to the common joint 11 of the two longerons, the common joint 11 being located at the midsection of the sub-structure.

Each diagonal member 18, 20 is hinged approximately at its midpoint; the hinge for diagonal member 18 is indicated in FIG. 1(a) by reference numeral 19, the hinge for diagonal member 20 is indicated in FIG. 1(a) by reference numeral 21. During the transition of the truss structure between the deployed condition and the collapsed condition, the movement of the diagonal members 18, 20 remain close to the plane defined by the sub-structure in its deployed configuration.

An additional frame member for each sub-structure is a non-rigid batten 22 that connects the common joint 11 of the two longerons 10, 12 of one sub-structure to the common joint 11 of the two longerons of another sub-structure. It is shown in the accompanying drawings as a flexible member that bows outward, but could alternatively have a hinge that allows folding, thereby allowing the non-rigid batten to be a segmented member. The non-rigid batten-longeron joint does not rotate. The non-rigid batten member allows the other frame members to be constructed as rigid segments, joined by single-degree-of-freedom hinges so as to be articulated in the manner necessary. In this way, the present structure maintains its minimal strain upon members with reduced hinge compliance. The truss structure of the present invention basically comprises three sub-structures joined together in a triangular cross-section configuration, as shown in FIG. 1(a). Only one illustrated sub-structure will be described in detail, although it should be apparent to one skilled in the art that the description applies equally to the remaining sub-structures.

As can be seen in FIG. 1(b), one collapses the truss structure by folding the diagonal members at their mid-point hinges 19 and 21. Each diagonal member is associated with a rigid batten member and a longeron. Folding a diagonal member at its mid-point hinge allows each rigid batten member and longeron to pivot about the batten-longeron hinge 13, which in turn causes the non-rigid battens to bow outward. The non-rigid battens continue to be bowed outward during the transition between the fully deployed and fully collapsed conditions, as illustrated in FIGS. 1(b) and 1(c). Once the truss structure is in its completely collapsed condition, the non-rigid batten member regains its fully extended, non-strained length.

FIG. 2 shows a detail of a diagonal hinge 21. The diagonal 20 is hinged at approximately its midpoint. As noted, the hinge 24 is a single-degree-of-freedom hinge. As indicated in FIG. 2, the hinge 21 is oriented along an axis in a plane inclined approximately 75 degrees from the plane in which the deployed folding diagonal is located. The preferred embodiment illustrated provides a minimum-strain design.

Figure 3A:
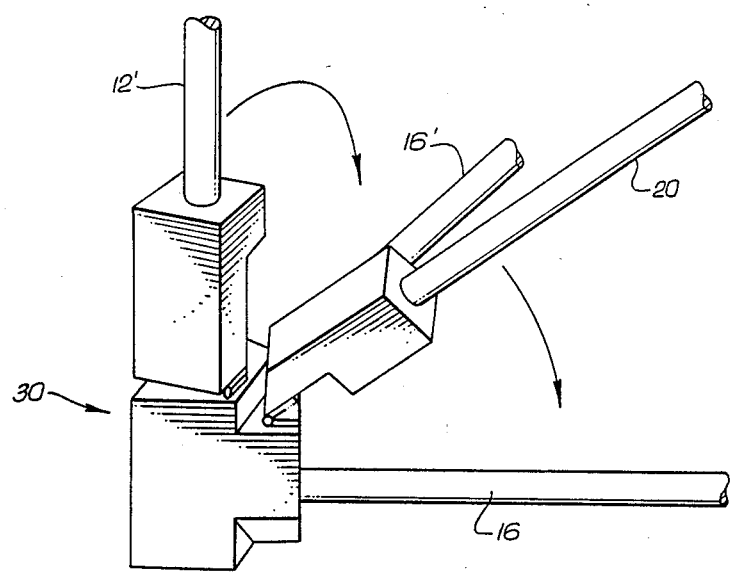
FIGS. 3(a) and 3(b) shows a perspective view of a detail of a base hinge.
Figure 3B:
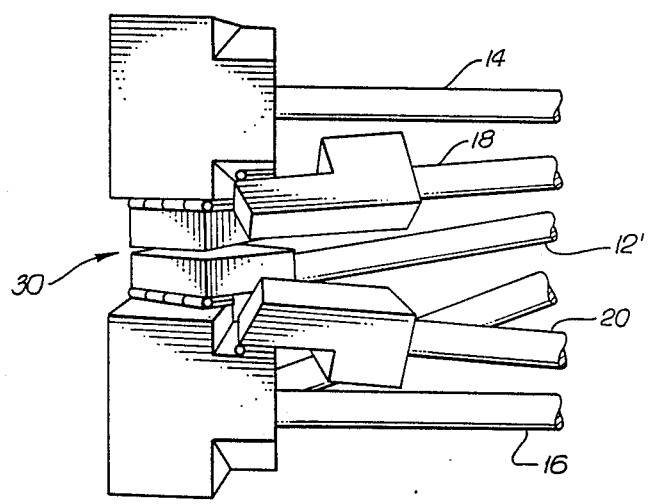

FIG. 3 shows a detail of one corner of the truss structure showing the relative positions of the various frame members. FIG. 3(a) shows a deployed configuration, with a rigid batten 16 and diagonal 20 of one sub-structure shown connected to a longeron 12' and rigid batten 16' of a second sub-structure. The truss structure is shown in its collapsed position in FIG. 3(b). This corner corresponds to the corner 30 shown in FIG. 1(a). The rigid batten members 14, 16 are maintained parallel relative to each other. FIG. 3 shows that four different structural members are joined to the corner joint 30. These members are the diagonal member 20, the rigid batten members 16 and 16', and the longeron member 12. FIG. 3 shows that the rigid batten members do not rotate relative to the joint 30, and that the diagonal 20 and longeron 12 are hinged such that they pivot in a plane perpendicular to the plane defined by the batten members. The details of the hinges themselves may vary from the example illustrated. FIG. 3 is merely intended to show the relative positions of the frame members in the deployed and collapsed positions.

Figure 4A:
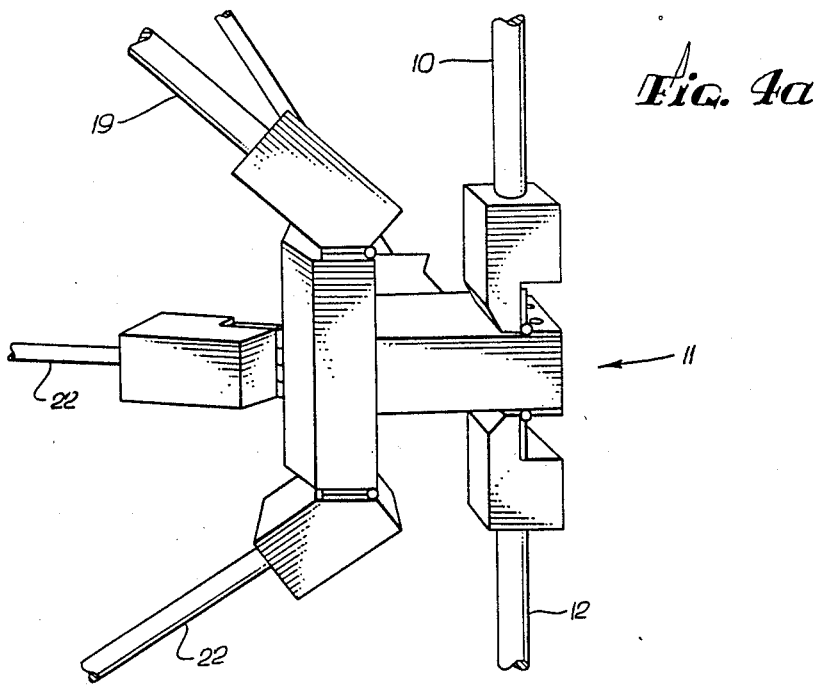
FIG. 4 shows a perspective view of a detail of a common joint hinge.
Figure 4B:
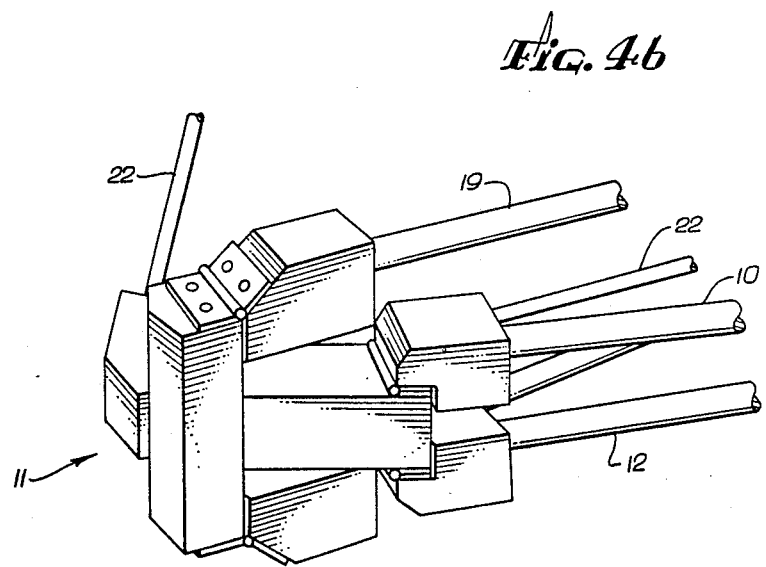

FIG. 4 shows a detail of a common hinge joint showing the relative position of the various frame members. FIG. 4(a) shows a deployed configuration, with a longeron 10 and diagonal 19 of one sub-structure shown connected to a longeron 12 and diagonal 20 of another sub-structure. The truss structure is shown in its collapsed condition in FIG. 4(b). This common hinge joint corresponds to the joint 11 shown in FIG. 1(a). The common hinge joint 11 is a single structure to which the individual truss members are joined by means of hinges. FIG. 4 shows that the six different structural members are hinged to the common hinge joint 11. The structural members include the longeron members 10 and 12, the diagonal members 18 and 20, and two flexible batten members, both designated 22. FIGS. 1 and 4 show that the flexible batten members 22 remain in the same relative plane during the transition between the deployed position and the collapsed position, and that the two longeron members and two diagonal members are hinged such that they pivot in a plane perpendicular to the plane defined by the batten members. The details of the hinges themselves may vary from the example illustrated. FIG. 4 is merely intended to show the relative positions of the frame members in the deployed and collapsed positions.

What is claimed is:

1. A truss structure movable between a collapsed position and a deployed position, having:

at least one frame unit, each frame unit comprised of three rigid batten, longeron, and diagonal members and three non-rigid batten members;

the three rigid batten members being connected at their end points so as to form an equilateral triangle;

each longeron being pivotally connected at a first end to an associated rigid batten member at each point of the triangle such that the longeron pivots about an axis perpendicular to the plane defined by its deployed and collapsed longitudinal axes and such that, in the deployed position, each longeron is perpendicular to the plane defined by the triangle;

each diagonal being hinged approximately at its midpoint and being hinged at its end points to the longeron and the associated rigid batten member, with each hinge approximately parallel to those of the longeron;

the non-rigid batten members being joined at the diagonal-longitudinal junction of one frame unit to the diagonal-longitudinal junction of an adjacent frame unit; and each non-rigid batten member having two ends and having a fully extended length, measured linearly from one end to the other end, and a deformed length, measured linearly from one end to the other end upon deformation of the non-rigid batten member, wherein the fully extended length is greater than the deformed length;

wherein each non-rigid batten member is dimensioned for allowing the non-rigid batten members to achieve their fully extended length upon the truss structure being in the collapsed position and for allowing the non-rigid batten members to deform and achieve their deformed length upon the truss structure being moved to a position intermediate the collapsed and deployed positions.

2. A truss structure according to claim 1, wherein the diagonals are hinged at both ends to non-rotating joints.

3. A truss structure according to claim 1, wherein each longeron is pivotally connected to the associated rigid batten member by means of a non-rotating joint.

4. A truss structure according to claim 1, wherein the longerons and diagonals are hinged with single-degree-of-freedom hinges.

5. A truss structure movable between a collapsed position and a deployed position, having:

first and second batten frames each comprised of three rigid batten members connected end to end so as to form an equilateral triangle;

three pairs of rigid longeron members, each longeron pair being hinged together end to end and interconnecting the first and second batten frames by being joined at one free end to a point of the equilateral triangle comprising the first batten frame and at their remaining free end to a corresponding point of the equilateral triangle comprising the second batten frame, each longeron pair defining a face of said truss structure in combination with associated rigid batten members forming corresponding sides of the equilateral triangles of the first and second batten frames;

three pairs of hinged diagonal members each located in a plane of a face of the truss structure, the diagonal members being hinged approximately at their mid-points and connected at a first end to a longeron-to-longeron junction and at their remaining ends to opposite longeron-to-longeron junctions; and three non-rigid batten members, one located on each face of the structure, joined to the structure from one longeron-to-longeron junction to another;

each non-rigid batten member having a first location joined to one longeron-to-longeron junction and a second location joined to another longeron-to-longeron junction;

each non-rigid batten member having a fully extended length, measured linearly from the first location to the second location, and a deformed length, measured linearly from the first location to the second location upon deformation of the non-rigid batten member, wherein the fully extended length is greater than the deformed length;

wherein each non-rigid batten member is dimensioned for allowing the non-rigid batten members to achieve their fully extended length upon the truss structure being in the collapsed position and for allowing the non-rigid batten members to deform and achieve their deformed length upon the truss structure begin moved to a position intermediate the collapsed and deployed positions.

6. A truss structure according to claim 5, wherein the diagonals are hinged at both ends to non-rotating joints.

7. A truss structure according to claim 2, wherein each longeron pair is pivotably connected to both batten frames by means of a non-rotating joint.

8. A truss structure according to claim 5, wherein the longerons and diagonals are hinged with single-degree-of-freedom hinges.

9. A truss structure movable between a collapsed position and a deployed position, having at least one frame unit, each frame unit comprised of a plurality of rigid batten, longeron, and diagonal members and corresponding number of non-rigid batten members;

the rigid batten members being connected at their end points so as to form an equilateral polygon;

each longergon being pivotally connected at a first end to an associated rigid batten member at each point of the polygon such that the longeron pivots about an axis perpendicular to the plane defined by its deployed and collapsed longitudinal axes and such that, in the deployed position, each longeron is perpendicular to the plane defined by the polygon;

each diagonal being hinged approximately at its mid-point and being hinged at its end points to the longeron and the associated rigid batten member, with each hinge approximately parallel to those of the longeron;

the non-rigid batten elements being jointed at the diagonal-longitudinal junction of one frame unit to the diagonal-longitudinal junction of an adjacent frame unit;

each non-rigid batten member having two ends and having a fully extended length, measured linearly from one end to the other end, and a deformed length, measured linearly from one end to the other end upon deformation of the non-rigid batten member, wherein the fully extended length is greater than the deformed length;

wherein each non-rigid batten member is dimensioned for allowing the non-rigid batten members to achieve their fully extended length upon the truss structure being in the collapsed position and for allowing the non-rigid batten members to deform and achieve their deformed length upon the truss structure being moved to a position intermediate the collapsed and deployed positions.

10. A trust structure according to claim 9, wherein the diagonals are hinged at both ends to non-rotating joints.

11. A truss structure according to claim 9, wherein each longeron pair is pivotably connected to both batten frames by means of a non-rotating joint.

12. A truss structure according to claim 9, wherein the longerons and diagonals are hinged with single-degree-of-freedom hinges.

13. A truss structure movable between a collapsed position and deployed position, having:
 first and second batten frames each comprised of a plurality of rigid batten members connected end to end so as to form an equilateral polygon;
 a corresponding number of pairs of rigid longeron members, each longeron pair being hinged together end-to-end and interconnecting the first and second batten frames by being joined at one free end to a point of the equilateral polygon comprising the first batten frame and at their remaining free end to a corresponding point of the equilateral polygon comprising the second batten frame, each longeron pair defining a face of said truss structure in combination with associated rigid batten members forming corresponding sides of the equilateral polygons of the first and second batten frames;
 a corresponding number of pairs of hinged diagonal members each located in a plane of a face of the truss structure, the diagonal members being hinged approximately at their mid-points and connected at a first end to a longeron-to-longeron junction and at their remaining ends to opposite longeron-to-batten junctions; and
 a corresponding number of non-rigid batten members, one located on each face of the structure, joined to the structure from one longeron-to-longeron junction to another;
 each non-rigid batten member having a first location joined to one longeron-to-longeron junction and a second location joined to another longeron-to-longeron junction;
 each non-rigid batten member having a fully extended length, measured linearly from the first location to the second location, and a deformed length, measured linearly from the first location to the second location upon deformation of the non-rigid batten member, wherein the fully extended length is greater than the deformed length;
 wherein each non-rigid batten member is dimensioned for allowing the non-rigid batten members to achieve their fully extended length upon the truss structure being in the collapsed position and for allowing the non-rigid batten members to deform and achieve their deformed length upon the truss structure being moved to a position intermediate the collapsed and deployed positions.

14. A truss structure according to claim 13, wherein the diagonals are hinged at both ends to non-rotating joints.

15. A truss structure according to claim 13, wherein each longeron is pivotably connected to the associated rigid batten member by means of a non-rotating joint.

16. A truss structure according to claim 13, wherein the longerons and diagonals are hinged with single-degree-of-freedom hinges.

* * * * *